Sept. 5, 1967 O. J. MAHA 3,339,932
SEALING APPARATUS
Original Filed Aug. 17, 1959
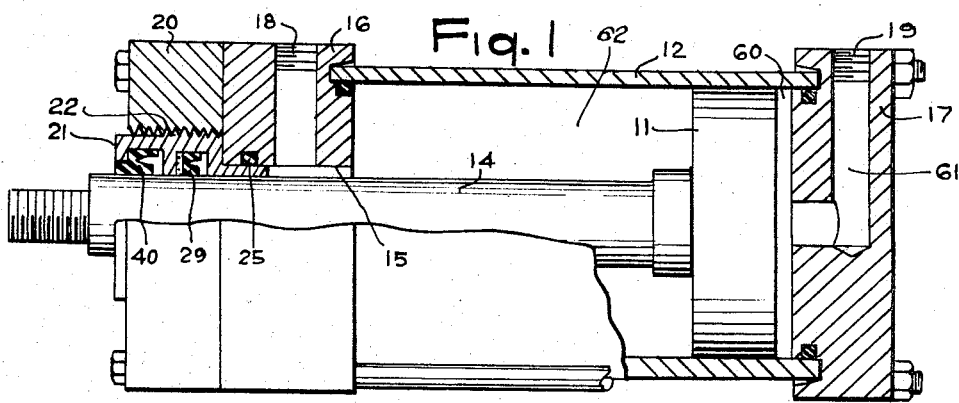
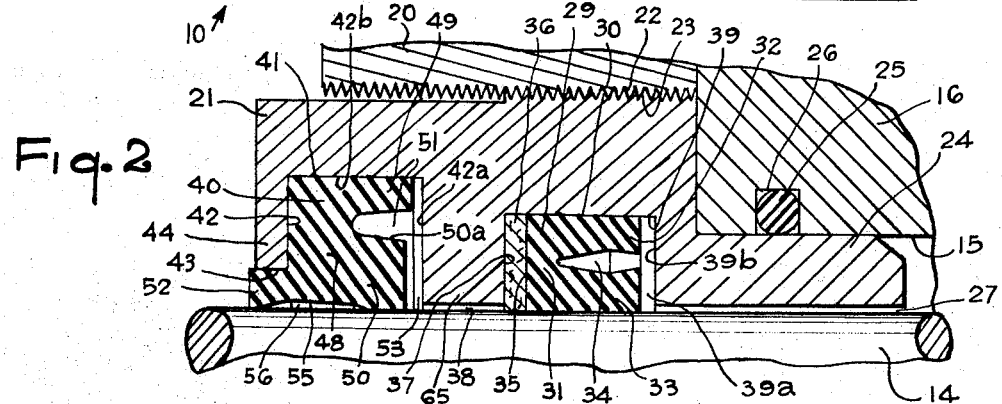
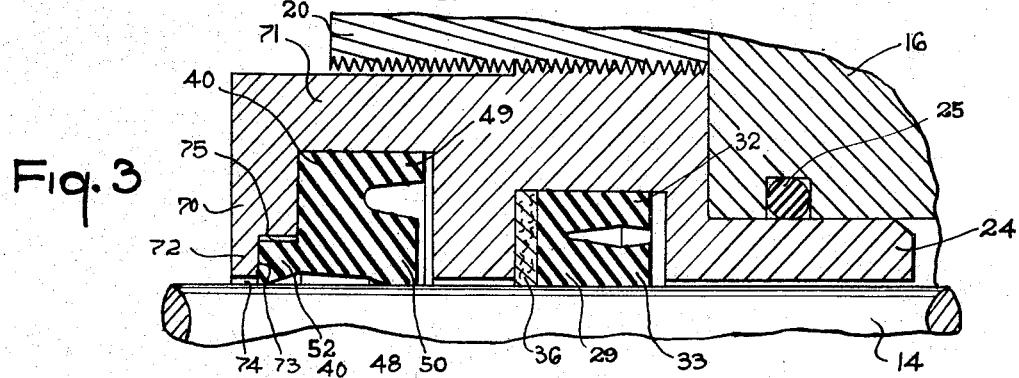
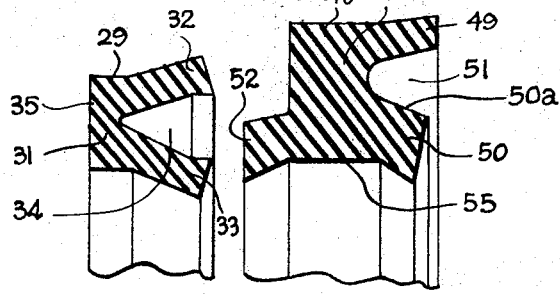
INVENTOR.
OTTO J. MAHA
BY Ooms, McDougall,
Williams & Hersh
ATTORNEYS

United States Patent Office 3,339,932
Patented Sept. 5, 1967

3,339,932
SEALING APPARATUS
Otto J. Maha, Dundee, Ill., assignor to Parker-Hannifin Corporation, Des Plaines, Ill., a corporation of Ohio
Continuation of application Ser. No. 834,043, Aug. 17, 1959. This application Mar. 1, 1965, Ser. No. 437,348
The portion of the term of the patent subsequent to Oct. 6, 1976, has been disclaimed
16 Claims. (Cl. 277—37)

This application is a continuation of my application Ser. No. 834,043, filed Aug. 17, 1959, and now abandoned, which was a continuation-in-part of my application Ser. No. 438,381, filed June 22, 1954, now Patent No. 2,907,-596, patented Oct. 6, 1959, for "Sealing Apparatus."

This invention relates to devices for sealing piston rods or other movable cylindrical members against leakage of fluid or lubricant between the piston rod and its guiding surface.

In fluid handling or fluid actuated devices which include a reciprocable stem or rod exposed to the fluid, as for example, a fluid pressure cylinder, packings are normally provided for sealing the rod. When the fluid is a liquid, or when a liquid or grease-type lubricant is provided for the rod in cases where the fluid is air or some other gas, it is desirable not only to seal the rod against substantial leakage therealong, but also to wipe the rod clean of any film or the liquid which may adhere to the rod as the latter moves outwardly past the packing chamber.

Likewise, when the rod moves inwardly it is desirable to wipe any foreign matter from the same to prevent the foreign matter from damaging the packing and/or from being carried past the packing into the cylinder or other device. To provide such sealing and wiping actions, separate wiping and sealing rings may be provided.

The present invention has for an object the combination of sealing and wiper rings so formed and supported within a packing gland that any liquid making its way past the sealing ring and wiped from the rod by the wiper ring will be returned directly past the sealing ring to the interior of the unit in which the rod is mounted. Return of the wiped liquid past the sealing ring in this manner makes it unnecessary to drain the leakage fluid exteriorly or to provide passages for returning the fluid to the system reservoir.

Another object is to provide a combination rod sealing and wiping apparatus in which fluid wiped from the rod exteriorly of the sealing ring may be returned to the working chamber from which it escaped even though the fluid in such chamber is under high pressure.

Another object is to provide a sealing and wiping apparatus in which a closed hollow space is provided between the sealing and wiping rings into which the wiped fluid may be collected until its pressure exceeds that of the working chamber from which it made its way past the sealing ring, and in which the wiper ring is firmly supported against blowout from its chamber due to high pressure of the fluid in such hollow space and will retain such wiped fluid until it is returned past the sealing ring to the working chamber.

Another object is to support the wiping ring in such a manner that it will be subjected to shearing stress by the pressure of wiped fluid only in a region of maximum section so as to provide maximum resistance to damage and extrusion from its chamber.

Another object is to support the wiping ring across the greater portion of its transverse thickness and in such a manner that it will not tend to be either funnelled or twisted out of its housing by the pressure of the wiped fluid.

Another object is to provide a construction in which the sealing ring provides a valving action to permit return of the wiped fluid from the hollow space as the latter is decreased in volume.

Another object is to provide a cartridge-type unit containing the sealing and wiping rings, which cartridge may be easily assembled or disassembled from a cylinder or other device.

Other objects and advantages of the invention will be apparent from the following description and from the drawings, in which:

FIG. 1 is a view, partly in section, of a hydraulic cylinder fitted with a sealing apparatus in accordance with the present invention;

FIG. 2 is a fragmentary section view of one form of the sealing apparatus; and

FIG. 3 is a fragmentary sectional view of a modified form of the sealing apparatus.

FIGS. 4 and 5 are enlarged sectional views showing the wiping and sealing rings of FIGS. 1–3 in their free state.

The illustrative embodiment of the invention shown in FIG. 1 comprises a hydraulic cylinder 10 which includes a piston 11 movable in a cylindrical casing 12. A cylinder rod 14, secured to the piston 11, extends through an axial bore 15 formed in an end cap 16 which includes an end plate 20, and which closes one end of the casing 12. The other end of the casing is closed by an end cap 17. Threaded openings 18 and 19 are formed in the end caps 16 and 17 to admit oil or other actuating fluid to the casing 12 on opposite sides of the piston 11. While the invention is illustrated in connection with a hydraulic cylinder, it is understood that it is also applicable to an air cylinder, or to any other device where it is desired to form a seal between inner and outer relatively reciprocable or rotatable cylindrical members.

In the hydraulic cylinder 10, the sealing apparatus for sealing the piston rod 14 includes a packing gland 21 having an enlarged threaded portion 22 adapted to be screwed into a threaded counterbore 23 in the end cap plate 20 for easy removal or replacement of the gland 21 for servicing the same. The gland 21 has a reduced inner end portion 24 received in the bore 15. An O-ring 25 of rubber-like material is seated in a groove 26 in the end cap 16 and is in sealing engagement with the groove 26 and the reduced portion 24 of the gland to prevent leakage of hydraulic oil from the interior of the cylinder casing 12 between the gland 21 and the end cap 16.

An axial bore 27 is formed in the gland 21 to provide a cylindrical bearing surface for the piston rod 14, it having a close fit therewith. The gland 21 may be made of bronze or other suitable bearing material and the rod 14 may be hardened or plated and highly polished to minimize friction.

To prevent leakage of oil between the rod 14 and the gland 21, a pressure sensitive sealing ring 29 of generally U-shaped cross section is disposed in an internal annular groove 30 formed in the gland. In this instance, the groove 30 has a generally rectangular cross section. The ring 29 comprises an annular body portion 31 having a generally rectangular cross section. Radially spaced sealing lips 32 and 33 extend from one end of the body portion 31 in the axial direction from which pressure is applied to the sealing ring 29 by fluid from the interior of the cylinder casing 12. The lip 32 is spaced radially outward of the lip 33 to form an open generally V-shaped annular groove 34 therebetween.

On the end of the ring 29 opposite from the lips 32 and 33, the annular body portion 31 is formed with a radially extending transverse end surface 35. A disk-shaped backup washer 36 is interposed between this flat end surface 35 and the adjacent flat end wall 37 of the groove 30 to prevent extrusion of the sealing ring 29 into the clearance space 38 between the piston rod 14 and the gland 21. The ring 29 is most advantageously made of synthetic rubber or other rubber-like material and such materials extrude into clearances under high pressures. The backup washer 36, on the other hand, is most advantageously made of leather or some other material, such as impregnated cork, which has high resistance to extrusion but will deform slightly to cover the clearance space 38 between the rod and the gland. Accordingly, the backup washer 36 prevents the sealing ring from extruding and being pinched between the rod 14 and the gland 21.

When the sealing ring 29 is in a free state, the sealing lips 32 and 33 diverge from each other, as illustrated and explained in application, Serial Number 438,381, with the lip 33 extending to a slightly smaller diameter than the diameter of the rod 14 and the lip 32 extending to a somewhat larger diameter than the groove 30. Consequently, when the ring 29 is in its position of use, the lips 32 and 33 are compressed into the space between the groove 30 and the rod 14 with the lip 33 exerting an initial sealing pressure on the rod 14 and the lip 32 exerting an initial sealing pressure on the outer cylindrical wall 39 of the groove 30. Fluid pressure acting between the lips 32 and 33 acts to increase the sealing pressure between the lips and the rod and groove wall in the well known manner.

The axial length of the groove 30 is preferably greater than the combined axial lengths of the rings 29 and 36. Thus, a space 39a is normally provided between the right-hand end of the sealing ring 29 and the adjacent flat end wall 39b of the groove 30.

Although the lips 32 and 33 provide a good seal against leakage of fluid from the interior of the casing 12 past the seal ring 29, there may be a very thin film of oil on the rod as it passes through the seal ring 29. To wipe this thin film of oil off the rod so that the portion of the rod extending outside of the end cap 16 will be virtually dry, the wiping ring 40 is provided. It is disposed in a second groove 41 formed in the gland 21, which second groove is open to the bore 27 at a point spaced from the point at which the groove 30 opens into the bore 27. The groove 41 is also generally rectangular in cross section and it has a flat outer end wall 42 which is substantially at right angles to the axis of the bore 27. The groove 41 has a flat radial inner end wall 42a and a cylindrical bottom wall 42b. An enlarged bore 43 is formed in the flange portion 44 to define an annular opening between the flange 44 and the rod 14.

The wiping ring 40 has a body portion 48 of generally rectangular cross section and it has radially inner and outer sealing lips 49 and 50 extending from one end of the body portion 48 in the direction from which fluid pressure is applied to the ring 40. There is a fluid receiving groove 51 between the lips 49 and 50. The lips 49 and 50 are similar to the corresponding lips on the ring 29, except that they are somewhat thicker. Also, the lip 50 is substantially thicker than lip 49, being approximately one-half the total radial thickness of the wiper ring. Each of the lips 49 and 50 is of nearly uniform thickness throughout its length. In their free state, the lips diverge somewhat with the lip 50 extending to a somewhat smaller diameter than the rod 14 and the lip 49 to a somewhat larger diameter than the bottom wall 42b of the groove 41 so that the lips will exert an initial sealing pressure when the ring 40 is in its place of use.

The lip 50 is substantially thicker than the lip 33 so that it will have greater rubber band action and hence press harder against the rod than the lip 33 so as to provide an effective wiping action even though there is no fluid pressure between the lips 49 and 50. It will be noted that the lip 50 is thicker than the opening between the bore 43 and rod 14, or in other words, the end wall 42 of the groove 41 extends transversely across the greater portion of the transverse thickness of the wiping ring 40 and opposite a substantial portion of the thickness of the lip 50. Also, the flange 44 is of substantial thickness so that the end wall 42 rigidly and unyieldingly supports the wiping ring across a major portion of its transverse thickness so that the wiping ring will not be extruded between the bore 43 and rod 14 due to high pressure of fluid. Moreover, by extending across a substantial portion of the transverse cross section of the lip 50, the end wall 42 supports the wiping ring in such a manner that axial outward displacement by fluid pressure of the radially inward portion of the lip 50 which is opposite the annular space between the rod 14 and the counterbore 43 is resisted by the shear strength of the entire length of the lip 50.

The wiping action of the lip 50 leaves the exposed portion of the rod virtually dry so as to minimize the tendency for foreign material to adhere thereto. To wipe off any foreign material which may nevertheless collect on the exposed portion of the rod 14, the wiping ring 40 is provided with an additional external wiping lip 52 which extends outwardly into the annular space between the bore 43 and rod 14.

The groove 41 is axially longer than the wiping ring 40 to provide a hollow space 53, which together with the groove 51, is adapted to receive and retain any oil passing the sealing ring 29, either by leakage past the lips 32 and 33 or by adherence to the rod 14 on the outward stroke thereof. The space 53 is open only to the bore of the gland 21 so that it will retain the fluid it contains even though such fluid develops a high pressure.

Between the oppositely extending wiping lips 50 and 52, the wiping ring 40 is formed with an outwardly relieved, internal, generally cylindrical surface 55 which affords a clearance space 56 between the ring 40 and the rod 14 when the ring is in position of use. This clearance reduces friction between the ring 40 and the rod 14.

In operation, when it is desired that the rod 14 move outwardly of the cylinder, hydraulic oil under high pressure is admitted to the chamber 60 formed between the piston 11 and end cap 17 through the port 19 and passage 61 to act on the piston 11 for forcing the rod 14 outwardly. At this time, hydraulic oil present in the space 62 between the piston 11 and end cap 16 is forced outwardly through the bore 15 and port 18 to the system reservoir and will be under relatively low pressure.

The sealing ring 29 is subjected to the hydraulic pressure in the chamber 62 inasmuch as the hydraulic oil readily penetrates the clearance space between the piston rod 14 and the internal bearing surface 27 of the gland 21. This is a desirable result in that the hydraulic fluid lubricates the rod 14 and the bearing 27 to facilitate reciprocation of the rod. (When air is used as the actuating fluid, a lubricant is introduced into the bearing 27 and in such case the sealing and wiping rings not only protect against loss of the motive fluid but also against loss of the lubricant.)

As the piston rod moves outwardly, the low pressure in chamber 62 is transmitted to the lips 32 and 33 of the sealing ring 29 to maintain the same in substantial sealing contact with the rod 14 and the outer wall of the groove 30. However, there may be a thin film of oil adhering to the rod 14 which will be carried past the lip 33. This thin film is practically all wiped off the rod by the lip 50 of the wiping ring, the lip 50 being shaped and designed particularly for this function, as more fully disclosed and claimed in my above-mentioned patent application, Ser. No. 438,381. The oil which is thus wiped from the rod 14 collects in the hollow space 53.

To effect a return of the piston rod 14, hydraulic oil under pressure is introduced through port 18 into the space 62 to act on the piston 11. At the same time, the port 19 is connected to the system reservoir so that the fluid within space 60 loses its high pressure and is forced outwardly through port 19 to the reservoir.

As the rod 14 moves inwardly, the wiped oil within hollow space 53 in contact with the rod 14 is carried toward the backup ring 36 and sealing ring 29 and a thin film of the oil adhering to the rod 14 will be carried past the lip 33 toward the chamber 62 despite the high pressure in the latter and despite the hydraulic pressure acting within the space 34 between the lips 32 and 33 to press the lip 33 against the rod 14. Thus, as the rod 14 reciprocates, there is a constant cyclical restoring action whereby any fluid that may be carried past the sealing ring 29, as a thin film on the rod 14, is wiped off the rod by the lip 50, is confined in the closed space 53, and is returned past the lip 33 to the chamber 62.

In the event oil from chamber 62 should pass the sealing ring 29 at a faster rate than it is returned by way of a film on the rod 14, the hollow space 53 (and groove 51) will gradually become filled with oil. As more oil is then brought into the space 53 by way of a film on the rod 14 as the latter moves outwardly, or by way of leakage past the sealing ring 29, there will be a buildup of pressure on the oil within space 53. When this pressure becomes high enough with respect to the prevailing pressure within chamber 62, the pressure in space 53 will cause the lip 33 to slightly raise from the rod 14 and permit fluid to pass from the space 53 to the chamber 62. The lip 33 thus provides a one-way check valve action for relieving such pressure. To facilitate this one-way check valve action, the lip 33 is thinner than the wiper lip 50.

The lip 50 has an outer circumferential surface 50a which is exposed to any pressure that may build up in the space 53. Thus, said pressure pushes the lip 50 against the rod 14 with increased force. This tends to increase the efficiency of the wiping action of the lip 50.

At times the fluid pressure developed within the space 53 may be considerably higher than the prevailing pressure within chamber 62. Thus, for example, assume that wiped oil has filled space 53. Now, as pressure is introduced into chamber 60 for effecting outward travel of the rod 14, any film of oil carried by the rod 14 outwardly past the lip 33 will be wiped off the rod by the lip 50. This additional oil delivered to the space 53 can cause momentary surges of very high pressures within space 53 before the relieving action of the lip 33 is brought into play. This is especially apt to happen if there is a sudden outward movement of the rod 14 due, for example, to a sudden release of the load acting externally on the rod 14.

Such pressure surges may build up to values substantially greater than the working pressure. Thus, not only is it important to provide adequate support for both the sealing ring and wiping ring so as to confine them within their proper positions of use against the working pressure of the system, but also to confine them against the effects of high pressure surges. To effect such adequate support, the sealing ring 29 and backup ring 36 are supported by the groove wall surface 37 formed on the wall section 65 which is rigid and substantially unyielding under the influence of fluid pressure surges. The wall surface 37 is substantially at right angles to the axis of the rod 14 so that there will be no funnelling or wedging action for driving the backup ring 36 and sealing ring 29 toward the annular clearance space 38 by pressure of the fluid within chamber 62.

Likewise, the flange 44 provides a rigid and non-yielding support for the wiping ring 40, and the groove end wall 42 is substantially at right angles to the axis of the bore 27 to prevent funnelling of the wiping ring out through the annular clearance space between the rod 14 and gland bore 43. Even though rubber-like materials tend to act like a fluid when subjected to high pressures, there is a considerable amount of shear strength in such materials used for packing rings. By extending the wall 42 across a part of the transverse cross section of the lip 50, advantage is taken of the shear strength of the entire axial length of the ring 29 for resisting extrusion through the bore 43 of the portion of the ring which is not supported by the wall 42.

In the optional construction shown in FIG. 3, the flange 70 of the gland 71 is thicker than the corresponding flange 44 of the gland 21 and it has an inward extension 72 providing an end wall 73 for supporting the end of the wiping lip 52 of the ring 40. This further supports the lips 50 and 52 against outward displacement by pressure of fluid within space 53 and provides a much smaller clearance space 74 between the extension 72 and the rod 14 through which the wiping ring might be extruded. A slight clearance 75 of a few thousandths of an inch may also be provided between the outer cylindrical surface of the wiping lip 52 and the flange 70 to permit self adjustment and proper action of the wiping lip 52 and to avoid excessive frictional contact of the lip 52 on the rod 14 due to forcible compression of the same between the rod 14 and flange 70.

Although two forms of the invention have been particularly illustrated and described, it is obvious that various modifications and equivalent constructions may be employed for practicing the true invention disclosed and claimed herein.

I claim:

1. In combination, an inner member mounted for reciprocation in a bore of an outer member, a fluid receiving chamber associated with said members, said outer member having first and second annular grooves open to said bore at spaced points, said first groove being in communication with said chamber, a soft resilient rubberlike sealing ring within said first groove and having a flexible fluid pressure responsive lip in substantial sealing contact with said inner member, a soft resilient rubberlike wiping ring within said second groove in contact with said inner member and adapted to wipe substantially all fluid from the portion of said inner member passing outwardly therethrough during reciprocation of said inner member, a closed hollow space in said outer member and open to said bore between said rings and adapted to receive fluid passing said sealing ring from said chamber and wiped from the rod by said wiping ring, said hollow space having portions communicating with both said first and second grooves and being open to both grooves for the passage of fluid therebetween in both directions, said lip being adapted to lift away from said inner member to permit return of fluid from said space to said chamber when the pressure of fluid within said space is greater than the pressure of fluid within said chamber, said second groove having a fixed end wall substantially at right angles to the axis of said bore and unyieldingly supporting said wiping ring across the greatest portion of the latter's transverse thickness for effectively retaining said wiping ring within said second groove against pressure of fluid within said space.

2. A combination in accordance with claim 1 in which said first groove has a fixed end wall substantially at right angles to the axis of the bore and unyieldingly supporting the sealing ring across substantially all of its transverse thickness against pressure of fluid within said chamber.

3. In combination, an inner member mounted for reciprocation in a bore of an outer member, a fluid receiving chamber associated with said members, said outer member having first and second annular grooves open to said bore at spaced points, said first groove being in communication with said chamber, a soft resilient rubberlike sealing ring within said first groove and having a fluid pressure responsive lip in substantial sealing contact with said inner member, a wiping ring within said second groove and having a soft resilient rubberlike wiping lip in contact with said inner member and adapted to wipe substantially all fluid from the portion of said inner member passing outwardly therethrough during reciprocation of said inner member, a closed hollow space in said outer member and open to said bore between said rings and adapted to receive fluid passing said sealing ring from said chamber and wiped from the rod by said wiping lip, said hollow space having portions communicating with both said first and second grooves and being open to both grooves for the passage of fluid therebetween in both directions, said fluid pressure responsive lip being adapted to lift away from said inner member to permit return of fluid from said space to said chamber when the pressure of fluid within said space is greater than the pressure of fluid within said chamber, said second groove having a fixed end wall extending across at least a portion of the transverse thickness of said wiping lip for retaining said wiping ring within said second groove against pressure of fluid within said space.

4. A combination in accordance with claim 3 in which said wiping lip is of substantially uniform thickness throughout its length whereby the shear strength of the entire length of the wiping lip is utilized for retaining the unsupported portion of said wiping lip against axial displacement by pressure of fluid within said space.

5. A combination in accordance with claim 3 in which said wiping lip is of greater thickness than said fluid pressure responsive lip for providing a more effective wiping action on the rod than said fluid pressure responsive lip.

6. A combination in accordance with claim 3 in which said wiping lip is substantially thicker than the fluid pressure responsive lip to provide a more effective wiping action on said rod than said fluid pressure responsive lip, and in which said end wall extends transversely across a substantial portion of the transverse thickness of the wiping lip for retaining said wiping lip against axial outward displacement due to pressure of fluid within said space.

7. A combination in accordance with claim 3 in which said wiping lip has a circumferential area exposed to pressure of fluid within said space whereby pressure of fluid within said space will increase the wiping contact pressure of said wiping lip with said rod.

8. In combination, an inner member mounted for reciprocation in a bore of an outer member, a fluid receiving chamber associated with said members, said outer member having first and second annular grooves open to said bore at spaced points, said first groove being in communication with said chamber, a soft resilient rubberlike sealing ring within said first groove and having a fluid pressure responsive lip in substantial sealing contact with said inner member, a soft resilient rubberlike wiping ring within said second groove, said wiping ring having radially spaced inner and outer lips extending toward said sealing ring, said inner lip being of a thickness substantially one-half that of the total thickness of said wiping ring and being of substantially uniform thickness throughout its length, said inner lip being in contact with said inner member and adapted to wipe substantially all fluid from the portion of said inner member passing outwardly therethrough during reciprocation of said inner member, a closed hollow space in said outer member and open to said bore between said rings and adapted to receive fluid passing said sealing ring from said chamber and wiped from the rod by said inner lip, said hollow space having portions communicating with both said first and second grooves and being open to both grooves for the passage of fluid therebetween in both directions, said fluid pressure responsive lip being adapted to lift away from said inner member to permit return of fluid from said space to said chamber when the pressure of fluid within said space is greater than the pressure of fluid within said chamber, said second groove having a fixed end wall substantially at right angles to the axis of said bore and overlapping said outer lip and at least a portion of the inner lip for unyieldingly supporting and retaining the wiping ring within said second groove against pressure of fluid within said space.

9. A combination in accordance with claim 3 in which said wiping ring has a lip extending toward the exposed outer end of the rod and said end wall includes an offset portion overlapping at least a portion of the transverse thickness of said last mentioned lip for unyieldingly supporting the same against axial displacement by pressure of fluid within said space.

10. A combination in accordance with claim 9 in which said second groove includes a circumferential wall between the offset portions of said end wall and radially spaced from said outwardly extending lip to permit radial self adjustment of the latter.

11. A seal cartridge for preventing leakage of fluid between inner and outer telescoped members, comprising a gland having means for attaching the same to said outer member and having a bore for receiving said inner member, said gland having first and second annular grooves open to said bore at spaced points, a soft resilient rubberlike sealing ring in said first groove and a soft resilient rubber like wiping ring in said second groove, said sealing ring having a fluid pressure responsive lip adapted to engage said inner member for preventing substantial leakage of fluid therealong in an outward direction toward said wiping ring while permitting passage of fluid in the opposite direction, a hollow space in said housing between said rings and open only to said bore and adapted to receive fluid passing said lip in said outward direction by adhesion to said inner member, fluid also being carried in an inward direction past said fluid pressure responsive lip by adhesion to said inner member, said wiping ring providing means for wiping fluid from said inner member for retaining said wiped fluid in said space, said wiping ring being unyieldingly supported by an end wall of said second groove whereby excess fluid within said space will result in a buildup of fluid pressure in said space sufficient to cause return of fluid from said space past said lip.

12. A seal cartridge in accordance with claim 11 in which said gland and said outer member each has a sealing surface adapted to be sealed by a packing interposed therebetween.

13. A seal cartridge in accordance with claim 11 in which said outer member has a bore and said gland has an annular portion receivable within said bore and said annular portion provides a sealing surface adapted to be sealed with respect to said bore by a packing ring interposed therebetween.

14. In combination, an outer member having a fluid receiving chamber and an opening leading thereto, a threaded counterbore surrounding the opening and a transverse shoulder at the bottom of the counterbore, a gland threaded into said counterbore and having a transverse face in abutment with said transverse shoulder, said gland having a cylindrical extension projecting into said opening, a packing interposed between said extension and the wall of said opening for sealing against leakage of fluid therebetween, said gland having a bore therethrough, an inner member reciprocably mounted within said bore and extending into said chamber, first and second annular grooves in said gland and open to said bore at spaced points, a soft resilient rubberlike sealing ring in said first groove and a soft resilient rubberlike wiping ring in said second groove, said sealing ring having a flexible fluid pressure responsive lip adapted to engage said inner member for preventing substantial leakage of fluid therealong in an outward direction toward said wiping ring while permitting passage of fluid in the opposite direction, a hollow space in said gland between said rings and open only to said bore and adapted to receive fluid passing said fluid pressure responsive lip in said outward direction by adhesion to said inner member, fluid also being carried in an inward direction past said fluid pressure responsive lip by adhesion to said inner member, said wiping ring having a wiping lip for wiping fluid from said inner member as the latter moves in said outward direction whereby said wiped fluid is retained in said hollow space, said wiping ring being unyieldingly supported by an end wall of said second groove whereby excess fluid within said hollow space will result in a buildup of pressure therein sufficient to cause return of fluid from said space past said fluid pressure responsive lip, said end wall extending transversely across at least a portion of said wiping ring lip for unyieldingly supporting the same against endwise displacement by pressure of fluid within said hollow space.

15. In combination, an outer member having a bore therein, an inner member mounted for reciprocation in said bore, said outer member having an annular groove therein open to said bore, a soft resilient rubberlike wiping ring disposed in said groove, said ring having a body portion, radially spaced inner and outer lips extending from one side of said body portion and generally parallel to the axis of said bore, said inner lip engaging said inner member and constituting a first wiping lip for wiping fluid from said inner member, a second wiping lip projecting from the opposite side of said body portion and generally parallel to the axis of said bore, said inner wiping lip engaging said inner member, said bore having an enlarged portion adjacent said groove and receiving said second wiping lip, said first wiping lip being generally rectangular in cross section and having a thickness substantially greater than the thickness of said second wiping lip, said groove having an end wall substantially at right angles to the axis of said bore and engaging said body portion of said ring on the side thereof opposite from said first wiping lip, said end wall overlapping said outer lip and a substantial portion of said first wiping lip for unyieldingly supporting and retaining the wiping ring within said groove against the action of fluid pressure on said first wiping lip, said first wiping lip having a substantially uniform thickness throughout its length so that the shear strength of the entire length of said first wiping lip is utilized for retaining said wiping lip in said groove against the action of fluid pressure, said other member including an additional end wall offset axially from said first-mentioned end wall and overlapping at least a substantial portion of the radial thickness of said second wiping lip for unyieldingly supporting said second wiping lip against axial displacement by the action of fluid pressure on said first wiping lip, said second end wall being substantially at right angles to the axis of said bore.

16. A combination in accordance with claim 15, in which said enlarged portion of said bore is spaced radially from said second wiping lip to provide for radial self-adjustment of said second wiping lip.

References Cited

UNITED STATES PATENTS

| | | | |
|---|---|---|---|
| 2,481,121 | 9/1949 | Kasten | 277—112 |
| 2,660,493 | 11/1953 | Flick | 277—212 X |
| 2,774,619 | 12/1956 | Mercier | 277—58 |
| 2,907,596 | 10/1959 | Maha | 277—205 |

SAMUEL ROTHBERG, *Primary Examiner.*